United States Patent Office

3,851,040
Patented Nov. 26, 1974

---

3,851,040
METHOD OF PURIFYING AND CONCENTRATING LITHIUM IONS
Giulio Alberti, Casal Palocco, Isola 33, Villino 47, and Maria Antonietta Massucci, Via Enrico Toti 3, both of Rome, Italy
No Drawing. Continuation-in-part of abandoned application Ser. No. 846,586, July 31, 1969. This application Sept. 29, 1972, Ser. No. 293,587
Int. Cl. B01d 11/00; C01g 56/00
U.S. Cl. 423—181                                    1 Claim

ABSTRACT OF THE DISCLOSURE

A method of purifying and concentrating lithium ions in an aqueous solution comprises the steps of adding a base to a solution containing lithium ions to provide a concentration of $OH^-$ ions in the solution which is greater or equal to the lithium ion concentration. Thorium acid arsenate is added to the resultant solution, whereby thorium lithium arsenate is formed. The arsenate is then washed in alkalinized water and lithium is removed from the arsenate with an acid solution, whereby the exchanger is restored to its original acid form and a purified concentrated lithium solution is obtained. The thorium acid arsenate may be a crystalline thorium acid arsenate having the formula $Th(HAsO_4)_2$ with an ion exchange capacity ranging between 1.40 to 3.55 meq./g. relatively to the lithium ion.

---

This invention relates to a method of purifying and concentrating lithium ions in an aqueous solution.

This application is a continuation-in-part of our copending patent application Ser. No. 846,586, filed July 31, 1969 and now abandoned.

In accordance with the present invention thorium acid arsenate is used for purifying and concentrating lithium ions from their solutions.

Thorium arsenate is a comparatively recently produced inorganic ion exchanger which as compared to all other known exchangers, is the only one which can exchange lithium ions. The reason lies in its crystalline structure which is particularly compact. Only lithium ions due to their small size can penetrate into this structure and replace hydrogen ions in the exchanger, while all other ions having a larger radius stay outside and can be retained at the surface only.

Thus thorium arsenate acts as a very fine ionic sieve. The ion exchange process is a reversible one and may be expressed as follows:

$$Th(HAsO_4)_2 + 2Li^+ \rightleftharpoons Th(LiAsO_4)_2 + 2H^+$$

In an alkaline environment (pH>9.5) thorium arsenate is totally transformed into a lithic form. In an acid environment thorium arsenate in lithic form is totally restored to original hydrogen form and lithium concentrates in the acid solution. In the following table some values of the exchanging ability of the thorium arsenate towards the lithium ion are shown at different pH values of the solution containing it. Thorium arsenate is stable enough with respect to hydrolysis and it does not lose any significant amount of arsenate ions at pH<12.

TABLE

Values of the ion exchange capacity of thorium arsenate toward the lithium ion at some pH vvalues of the solution containing it (the initial concentration of $Li^+$ in the solution being equal to 0.1 meq./ml.).

| pH: | $Li^+$ in the exchanger (meq./g.) |
|---|---|
| 9.25 | 0.28 |
| 9.52 | 1.40 |
| 9.62 | 2.50 |
| 9.75 | 3.26 |
| 11.40 | 3.55 |

An object of the present is the provision of an effective method of purifying and concentrating lithium ions by the use of thorium acid arsenate preferably prepared in accordance with methods described hereinafter.

Other objects will become apparent in the course of the following specification.

Thorium acid arsenate may be obtained from a solution containing arsenic acid and a thorium salt by boiling it for a sufficient period of time or by placing it in an autoclave at temperatures higher than 100° C. The best results are achieved with concentrations of arsenic acid in the range of 2 to 4 M and with concentrations of a thorium salt in the range of 0.1 to 1 M while the molar ratio of the aresnic acid to the thorium salt is maintained in the range 2 to 20.

The following examples describe by way of illustration only preferred methods of preparing thorium acid arsenate:

EXAMPLE 1

A 1–2 molar solution of thorium nitrate in nitric acid was mixed with a solution of arsenic acid to obtain a solution of which the final molar concentrations were 0.33 thorium nitrate, 3.3 arsenic acid and 1.2 nitric acid. This solution was kept boiling to fall back until a microcrystalline precipitate was formed which generally occurred 2–5 days after the boiling was started. The boiling to fall back was then continued until no significant modifications were observed in the X-ray diffraction spectrum of samples taken out at various stages of the boiling operation. The average boiling time to start the precipitation in the different tests was about 200 hours. The material was then separated from the solution, washed with distilled water to attain a pH value ranging between 4 and 5 and finally dried in air. The final product was in the form of a white powder.

EXAMPLE 2

A solution identical to that prepared in Example 1 was placed in an autoclave at temperatures slightly higher than 100° C. (103–110° C.). After a period of time varying from 2 to 10 days depending on the temperature the precipitated material was separated from the solution. The subsequent process steps were the same as in Example 1.

This process is speedier than that described in Example 1.

Thorium acid arsenate prepared in the above-described manner can be used for purifying and concentrating lithium salts according to the following methods:

EXAMPLE 3

The lithium salts solution to be processed is first alkalized with any base such as NaOH, KOH, $Ca(OH)_2$, $NH_3$ etc. In determining the amount of the base to be added it should be kept in mind that the concentration of the $OH^-$ ions in the solution must at least equal the concentration of the $Li^+$ ions.

If any ions are also present in the solution which are capable of forming insoluble hydroxyls, a precipitate may separate from the solution. In such case the precipitate should be removed from the solution. The alkaline solution is then slowly percolated through a chromatographic column containing the thorium acid arsenate. In this way lithium is separated from the other ions in the solution because lithium only is retained by the exchanger. A small volume of distilled water is then percolated which had previously been alkalized to pH 9-10 with NaOH for the purpose of washing the thorium arsenate in lithic form off the adhering solution. Subsequently, a small volume of acid solution is percolated for the purpose of eluting the lithium ion from the exchanger. In this way the thorium arsenate is restored to its original hydrogen form while the lithium ion is purified and concentrated in a small volume of solution. In order to use again the thorium acid arsenate in a fresh cycle, it suffices to wash it in the column with distilled water.

It is apparent that other procedures may be used for converting thorium acid arsenate into its lithic form and for restoring it into its hydrogen form. For example, currently used industrial processes of ion exchange can be applied, such as a mobile bed of exchanger or a process in countercurrent.

It is also possible to add thorium acid arsenate directly to the process solution containing lithium ions, thorium arsenate being subsequently recovered through filtration or centrifuging.

The following example sets forth by way of illustration only, a method of purifying and concentrating lithium from a lithic solution containing sodium:

EXAMPLE 4

To one liter solution containing 110 mg. lithium and 2,300 mg. sodium, 5 g. thorium arsenate and 0.8 g. NaOH were added. After a three day contact with the solution the exchanger was removed from the solution by filtration or centrifuging. In such conditions an amount of the lithium in the solution greater than 90% was retained by the exchanger. The lithium ion was eluted from the exchanger with 50 ml. hydrochloric acid 0.4 N. The chemical analysis of the elution gave the following quantities as an average of various tests: lithium: 101 mg.; sodium: 2 mg. Thus, with the process as above described the two-fold object was achieved of purifying the lithium ion from strong concentrations of sodium and substantially concentrating it. In addition the exchanger is totally restored to its original hydrogen form ready for being used again in further process cycles.

It is apparent that various changes can be made in the described examples within the scope of the appended claim.

What is claimed is:

1. A method of purifying and concentrating lithium ions from an aqueous solution wherein they are contained together with other ions which method comprises adding to said solution a caustic solution to obtain a solution wherein the concentration of hydroxyl ions is equal at least to the lithium ion concentration; percolating the solution so obtained through a bed consisting of crystalline thorium acid arsenate having the formula $Th(HAsO_4)_2$ and an ion exchange capacity ranging between 1.40 and 3.55 meq./g. toward the lithium ion to thereby obtain thorium and lithium arsenate; washing said thorium and lithium arsenate with water previously alkalized at a pH from 9 to 10; percolating a hydrochloric acid solution through said thorium and lithium arsenate to elute the lithium ions therefrom whereby a concentrated and purified lithium solution is obtained and the thorium arsenate is restored to its initial form.

References Cited

UNITED STATES PATENTS

| 2,980,497 | 4/1961 | Goodenough et al. | 423—181 |
| 3,056,647 | 10/1962 | Amphlett | 423—252 |
| 2,980,498 | 4/1961 | Wheaton et al. | 423—181 |
| 3,382,034 | 5/1968 | Kraus | 423—252 |
| 3,101,246 | 8/1963 | Hansford et al. | 423—181 |

OTHER REFERENCES

LeFlem et al.: Le système $As_2O_5$—$ThO_2$, Bulletin de la Société Chemique de France, fascicule 6, June 1966, pp. 1180-83.

CARL D. QUARFORTH, Primary Examiner

R. L. TATE, Assistant Examiner

U.S. Cl. X.R.

423—6, 252; 252—301.1 R; 210—38